(12) United States Patent
Steinmeier

(10) Patent No.: US 12,313,135 B2
(45) Date of Patent: May 27, 2025

(54) BRAKE DISK AND METHOD FOR PRODUCING SAME

(71) Applicant: C4 Laser Technology GmbH, Freital (DE)

(72) Inventor: Tilo Steinmeier, Pohrsdorf (DE)

(73) Assignee: C4 Laser Technology GmbH, Freital (DE)

( * ) Notice: Subject to any disclaimer, the term of this patent is extended or adjusted under 35 U.S.C. 154(b) by 376 days.

(21) Appl. No.: 17/801,542

(22) PCT Filed: Feb. 25, 2020

(86) PCT No.: PCT/EP2020/054888
§ 371 (c)(1),
(2) Date: Aug. 23, 2022

(87) PCT Pub. No.: WO2021/170216
PCT Pub. Date: Sep. 2, 2021

(65) Prior Publication Data
US 2023/0151859 A1  May 18, 2023

(51) Int. Cl.
| | |
|---|---|
| F16D 65/12 | (2006.01) |
| B23K 26/342 | (2014.01) |
| B23K 101/00 | (2006.01) |
| B23K 103/16 | (2006.01) |
| F16D 65/02 | (2006.01) |

(52) U.S. Cl.
CPC .......... *F16D 65/127* (2013.01); *B23K 26/342* (2015.10); *B23K 2101/006* (2018.08); *B23K 2103/172* (2018.08); *F16D 2065/132* (2013.01); *F16D 2200/0013* (2013.01); *F16D 2200/0065* (2013.01); *F16D 2200/0069* (2013.01); *F16D 2250/0046* (2013.01)

(58) Field of Classification Search
CPC ..... F16D 65/123–128; F16D 2065/132; F16D 2200/0013; F16D 2200/0065; F16D 2200/0069; F16D 2250/0046; B23K 26/342; B23K 2103/172; B23K 2101/006
USPC .................................................. 188/218 XL
See application file for complete search history.

(56) References Cited

U.S. PATENT DOCUMENTS

| | | | | |
|---|---|---|---|---|
| 11,339,841 | B2 * | 5/2022 | Rettig | B23K 26/144 |
| 11,788,593 | B2 * | 10/2023 | Carminati | C23C 4/08 |
| | | | | 188/218 XL |
| 11,867,243 | B2 * | 1/2024 | Potapenko | C23C 24/103 |
| 2005/0082123 | A1 * | 4/2005 | Khambekar | F16D 65/127 |
| | | | | 188/71.1 |
| 2007/0286961 | A1 * | 12/2007 | Pahle | C23C 4/02 |
| | | | | 188/218 XL |

(Continued)

FOREIGN PATENT DOCUMENTS

| | | |
|---|---|---|
| DE | 102004016092 A1 | 10/2005 |
| DE | 102004016096 A1 | 10/2005 |

(Continued)

*Primary Examiner* — Christopher P Schwartz
(74) *Attorney, Agent, or Firm* — Michael Soderman

(57) ABSTRACT

The invention relates to a brake disk (3), which has at least one thermal conduction layer (4, 6) with a thermal conductivity and specific thermal resistivity that can be graduated, the thermal conduction layer consisting of at least two different materials or of a varying layer thickness, thereby graduating the thermal conductivity or the thermal resistivity within the thermal conduction layer.

21 Claims, 4 Drawing Sheets

(56) References Cited

U.S. PATENT DOCUMENTS

| | | | | |
|---|---|---|---|---|
| 2011/0293849 A1* | 12/2011 | Lembach | ............ | F16D 65/127 |
| | | | | 148/284 |
| 2017/0122392 A1* | 5/2017 | Lembach | ................ | F16D 69/04 |
| 2020/0386287 A1* | 12/2020 | Martino | ................ | F16D 65/125 |
| 2022/0250996 A1* | 8/2022 | Mehr | .................... | C04B 41/89 |
| 2023/0046519 A1* | 2/2023 | Steinmeier | ............. | C23C 30/00 |
| 2024/0344575 A1* | 10/2024 | Liu | ........................ | C22C 38/02 |

FOREIGN PATENT DOCUMENTS

| | | | | |
|---|---|---|---|---|
| DE | 102005008569 A1 | 10/2006 | | |
| DE | 102008053637 A1 | 5/2010 | | |
| DE | 102008053637 B4 * | 1/2012 | ........... | F16D 65/127 |
| DE | 102014006064 A1 | 6/2015 | | |
| DE | 102014015474 A1 | 4/2016 | | |
| EP | 3034902 A1 | 6/2016 | | |
| WO | 2007043961 A1 | 4/2007 | | |

\* cited by examiner

BRAKE DISK AND METHOD FOR PRODUCING SAME

CROSS REFERENCE TO RELATED APPLICATIONS

This application is the U.S. national stage of International Application No. PCT/EP2020/054888, filed on 2020 Feb. 25.

BACKGROUND

The present invention relates to the field of vehicle technology and of industrial plant technology and relates to a brake disk having at least one heat conduction layer with gradated thermal conductivity and specific heat resistance. The invention also relates to a method of producing the brake disk of the invention. The proposed brake disk may be used, for example, as internally ventilated brake disk in vehicles or as brake disk for industrial brakes or in wind turbines.

Conventional brake disks in vehicles and in industrial plants take the form either of a brake disk in one-piece form made of a metallic or ceramic material or of a composite brake disk or multipart brake disk composed of one or more metallic or ceramic materials.

Brake disks in motor vehicles are secured on the rotating front and rear axles, and for this purpose have planar contact surfaces that are in contact with the wheel rim on the one hand and the wheel bearing on the other.

In addition, brake disks have regions having friction surfaces, by means of which the braking action is implemented in association with brake linings.

For better dissipation of the heat that arises, brake disks may be designed, for example, as internally ventilated disk brakes. For this purpose, they have corresponding ventilation ducts on the inside of the brake disk nave, which firstly suck in air that flows through the brake disk and dissipate the heat that arises in the brake disk and hence ensure the cooling of the brake unit.

The prior art proposes various solutions for improvement of protection of brake disks from wear and corrosion.

DE 10 2008 053 637 A1 discloses a friction ring for a brake disk, said friction ring having a coating at least in some regions, wherein the coating has a thickness profile with different coating thicknesses. The coating has been applied by a thermal spraying method or PVD method.

DE 10 2005 008 569 A1 discloses a process for producing a friction element, in which a main friction element body is provided and a coating is applied. The coating includes a sealing alloy, which is melted in a thermal production method.

WO 2007/043 961 A1 discloses a coated vehicle component that has been produced from an essentially metallic main material and comprises at least one working face arranged to be exerted to relative movement friction wear with 5 movements, and comprises a wear-resistant coating. A particular feature of the component is an outer coating comprising more than 50% by weight and less than 99% by weight of molybdenum, with the balance preferably being at least one element from a first group comprising aluminum, boron, carbon, chromium, cobalt, lanthanum, manganese, nickel, niobium, oxygen, silicon, tantalum, tungsten, yttrium and normal impurities.

DE 10 2014 006 064 A1 discloses a component comprising a gray iron substrate and at least one outer layer, wherein a surface layer is formed directly on the gray iron substrate between the substrate and the outer layer, the surface layer including nitride-, carbide- and/or oxide-containing laminas. The outer layer consists of a cermet material of a metallic matrix and an oxide ceramic component distributed therein that accounts for 30% to 70% by weight of the cermet material.

DE 10 2014 015 474 A1 discloses a brake disk having a gray iron substrate with multiple surface layers disposed at least on the friction surface, wherein the surface layers over the gray iron substrate, in sequence from the substrate to the outer layer, have at least one bonding layer, an anticorrosion layer composed of nitrated, nitrided or nitrocarburized bonding layer material and optionally gray iron material, an optional oxide layer essentially composed of iron oxides, and an antiwear or friction layer composed of oxide ceramic or cermet material. The bonding layer is formed from the material of the gray iron substrate with a proportion of Cr and/or Mo that has been increased to 20% to 60% by weight, with the predominant proportion of the lamellar carbon in the gray iron chemically bound in the bonding layer in the form of Cr and/or Mo carbide.

The known solutions provide various coatings of a metallic main body consisting essentially of gray iron, which enable improved protection of the brake disk from corrosion and wear.

However, a disadvantage is that, especially in the case of brakes for electromobility, which are increasingly coming to the fore, that utilize recuperation for energy recovery, the necessary operating temperatures are not attained in the interaction of brake disk and brake linings since the braking system is subject to much less frequent stress on account of the energy conversion. This can lead to worsened braking performance up to and including complete failure of the entire braking system.

Moreover, a disadvantage from the prior art is that, on account of the different brake disk coatings proposed that are configured essentially as a hard material layer, the appropriate material combination of the brake linings that interact with the brake disk always has to be adapted to the existing coatings of the brake disk in a costly and inconvenient manner.

And another disadvantage is that in brake disks, on account of different thermal input, stresses arise within the brake disk as a result of temperature spikes in part-regions of the friction surfaces. This disadvantageously leads to warpage of the brake disk (also called coning), which in turn leads to cracking, especially in the uppermost hard material layer.

SUMMARY

It is an object of the present invention to provide a novel brake disk that eliminates the disadvantages of the prior art.

The object is achieved by the invention specified in the claims. Advantageous configurations are the subject of the dependent claims, and the invention also includes combinations of the individual dependent claims by way of an "and" linkage, provided that they are not mutually exclusive.

DETAILED DESCRIPTION

The object of the invention is achieved by a brake disk, comprising a metallic main body, which has at least one ring-shaped securing element for securing of the brake disk on a rotating axis, a first friction region that faces a rotating axis and takes the form of a circular surface, and a second friction region arranged so as to be diametrically opposite the first friction region and remote from a rotating axis, wherein the metallic main body, in the region of the first and second friction regions, has at least one ring-shaped heat conduction layer which is disposed at least one tribologically stressable hard material layer, wherein the at least one heat conduction layer is disposed atop the metallic main body and the tribologically stressable hard material layer atop the heat conduction layer by means of laser buildup welding, so as to achieve a cohesive bond between the layers, wherein the heat conduction layer consists of at least two different materials and the thermal conductivity $\lambda$ within the heat conduction layer is gradated, wherein there is a metallic or ceramic material and/or a metallic alloy having a thermal conductivity $\lambda_1$ at least in an inner circumferential region of the first and/or second friction regions, and wherein there is a metallic or ceramic material and/or a metallic alloy having a thermal conductivity $\lambda_2$ in an outer circumferential region of the first and/or second friction regions, wherein at least $\lambda_1 < \lambda < \lambda_2$.

The object of the invention is also achieved by a brake disk having a metallic main body which has at least one ring-shaped securing element for securing of the brake disk on a rotating axis, a first friction region that faces a rotating axis and takes the form of a circular surface, and a second friction region arranged so as to be diametrically opposite the first friction region and remote from a rotating axis, wherein the metallic main body, in the region of the first and/or second friction regions, has at least one ring-shaped heat conduction layer atop which is disposed at least one tribologically stressable hard material layer, wherein the at least one heat conduction layer is disposed atop the metallic main body and the tribologically stressable hard material layer atop the heat conduction layer by means of laser buildup welding, so as to achieve a cohesive bond between the layers, and wherein at least one of the heat conduction layers, in radial direction relative to the outer circumference of the brake disk, has a gradated layer thickness $d_{SW}$, as a result of which the specific heat resistance $R_{thi}$ decreases in the heat conduction layer in radial direction toward the outer circumference of the brake disk.

There is advantageously an arrangement of at least two heat conduction layers, wherein a first heat conduction layer is disposed atop the metallic body and a second heat conduction layer atop the first heat conduction layer, wherein the at least second heat conduction layer in each case forms an interfacial region with the tribologically stressable hard material layer and with the first heat conduction layer.

In a further advantageous configuration of the brake disk, the at least one heat conduction layer and/or tribologically stressable hard material layer on the friction region facing a rotating axis is formed with different layer thickness compared to the at least one heat conduction layer and/or stressable hard material layer on the friction region remote from a rotating axis.

Also advantageously, in radial direction toward the outer circumference of the brake disk, there is at least one heat conduction layer in an inner circumferential region that extends up to a maximum of 40% of the circumferential area, a material having a thermal conductivity $\lambda_1$ of 10 W/(m·K) to 14 W/(m·K), in a middle circumferential region that extends from 30% to a maximum of 65% of the circumferential area a material having a thermal conductivity $\lambda_2$ of 12 W/(m·K) to 26 W/(m·K), and in an outer circumferential region that extends from 60% up to the outer circumference of the circumferential area a material having a thermal conductivity $\lambda_3$ of 24 W/(m·K) to 40 W/(m·K).

It is also advantageous when at least one heat conduction layer has a layer thickness $d_{SW}$ that increases continuously or abruptly in radial direction toward the outer circumference of the brake disk.

Advantageously, at least one heat conduction layer has a layer thickness $d_{SW}$ of 50 μm to 500 μm, particularly advantageously a layer thickness $d_{SW}$ of 100 μm to 150 μm.

It is further advantageous when, in radial direction toward the outer circumference of the brake disk, the heat conduction layer has a 10%-15% greater layer thickness $d_{SW1}$ in an inner circumferential region that extends up to a maximum of 40% of the circumferential area and, in a middle circumferential region that extends from 30% to a maximum of 65% of the circumferential area, a 5%-10% greater layer thickness $d_{SW2}$ compared to the layer thickness $d_{SW3}$ in an outer circumferential region that extends from 60% of the circumferential area to the outer circumference, wherein the layer composition composed of heat conduction layer and tribologically stressable hard material layer is constant.

Advantageously, the heat conduction layer has been produced from an Al-based, Fe-based, Ni-based, Cr-based and/or Cu-based alloy.

Likewise advantageously, at least the heat conduction layer additionally includes carbidic and/or oxide ceramic hard material particles, in which case, advantageously, the hard material particles of the heat conduction layer have a median particle size $D_{50}$ of 0.5 μm to 120 μm, and in which case, likewise advantageously, the proportion by volume of the hard material particles in the heat conduction layer is 1% to 80%, particularly advantageously 30% to 50%.

In an advantageous configuration of the brake disk, the heat conduction layer takes the form of an alloy in which, in axial direction, the lowest thermal conductivity is in a radial part-region and in the interfacial region with the tribologically stressable hard substance layer, and the highest thermal conductivity in the interfacial region with a further heat conduction layer or the metallic main body.

Advantageously, there is a bonding layer at least between the metallic main body and the at least first heat conduction layer.

Further advantageously, the tribologically stressable hard material layer has at least a layer thickness $d_{SH}$ of 50 μm to 500 μm, and particularly advantageously a layer thickness $d_{SH}$ of 200 μm to 250 μm.

The tribologically stressable hard material layer is advantageously made of a cermet, particularly advantageously of silicon carbide, boron carbide, tungsten carbide, vanadium carbide, titanium carbide, tantalum carbide, chromium carbide and/or an oxide ceramic, and very particularly advantageously of tungsten carbide with a stainless steel matrix of material group 4 or 5 with an Ni content of ≤15% by mass.

The object of the invention is additionally achieved by a method of producing the brake disk as claimed in accordance with the invention, in which a first heat conduction layer is disposed in a cohesively bonded manner at least partly at least atop a metallic main body by means of laser buildup welding, and then a tribologically stressable hard material layer is disposed in a cohesively bonded manner atop the first heat conduction layer, wherein the heat conducting layer consists of at least two different materials and the thermal conductivity $\lambda_i$ within the heat conduction layer is gradated, such that the heat conduction layer has increasing thermal conductivity $\lambda$ in radial direction, wherein a metallic or ceramic material and/or a metallic alloy having a thermal conductivity $\lambda_1$ is disposed at least in an inner circumferential region of the first and/or second friction regions and a metallic or ceramic material and/or a metallic alloy having a thermal conductivity $\lambda_2$ is disposed in an outer circumferential region of the first and/or second friction regions, and the surface of the tribologically stressable hard material layer is finally processed.

In addition, in accordance with the invention, a first heat conduction layer is disposed in a cohesively bonded manner at least partly at least atop a metallic main body by means of laser buildup welding, and then a tribologically stressable hard material layer is disposed in a cohesively bonded manner atop the first heat conduction layer, so as to achieve a cohesive bond between the layers, wherein at least one heat conduction layer, in radial direction relative to the outer circumference of the brake disk, is disposed with gradated layer thickness $d_{SW}$, as a result of which the specific heat resistance $R_{thi}$ decreases in the heat conduction layer in radial direction toward the outer circumference of the brake disk.

In an advantageous configuration of the method, in a first step, in radial direction, the heat conduction layer is disposed in an inner circumferential region that extends up to a maximum of 35% of the circumferential area with a 10%-15% greater layer thickness $d_{S1}$, and in a middle circumferential region that extends from 30% to a maximum of 65% of the circumferential area with a 5%-10% greater layer thickness $d_{S2}$ compared to the layer thickness $d_{S3}$ in an outer circumferential region that extends from 60% of the circumferential area to the outer circumference of the brake disk, such that the specific heat resistance $R_{thi}$, in the heat conduction layer, decreases in a gradated manner from the inner circumferential region to the outer circumferential region.

Advantageously, in radial direction toward the outer circumference of the brake disk, at least one heat conduction layer is disposed in an inner circumferential region that extends up to a maximum of 35% of the circumferential area, a material having a thermal conductivity $\lambda_1$ of 10 W/(m·K) to 14 W/(m·K), in a middle circumferential region that extends from 30% to a maximum of 65% of the circumferential area a material having a thermal conductivity $\lambda_2$ of 12 W/(m·K) to 26 W/(m·K), and in an outer circumferential region that extends from 60% up to the outer circumference of the circumferential area a material having a thermal conductivity $\lambda_3$ of 24 W/(m·K) to 40 W/(m·K).

It is particularly advantageous when, before the heat conduction layer is disposed by means of laser buildup welding, the metallic main body is heated at least in a subregion of the first and/or second friction regions to a temperature of 150° C. to 500° C.

The solution of the invention provides a novel brake disk with which, in particular, the thermal budget is controlled in an efficient manner throughout the brake disk and a homogeneous temperature distribution is enabled within the brake disk with improved braking performance. Moreover, the novel brake disk effectively prevents thermal stresses and cracking in a simple manner, with homogeneous distribution of the thermal input into the brake disk and controlled temperature distribution within the brake disk.

The novel brake disk is usable in industrial plants, in wind turbines and especially in vehicles, and vehicles shall be understood to mean not just cars but also trucks, mopeds and bicycles.

The brake disk of the invention has a metallic main body having a ring-shaped securing element for securing of the brake disk on a rotating axis, a first friction region that faces a rotating axis and takes the form of a circular surface, and a second friction region arranged so as to be diametric to the first friction region and remote from a rotating axis and likewise in the form of a circular surface. In addition, the brake disk, on the first and/or second friction region, has at least one heat conduction layer designed in accordance with the invention, and a tribologically stressable hard material layer disposed thereon.

Braking operations give rise to typical temperature maps.

It has been found that the ring-shaped securing element for securing of the brake disk to a rotating axis has significantly lower thermal stress than the first and second friction regions of the metallic main body.

The reason for the lower thermal stress on the ring-shaped securing element is the material of the metallic main body, which, like the metallic main body, is typically produced from gray iron and hence has a high thermal conductivity $\lambda$ in the region of about 50 W/(m·K).

By contrast, the temperature especially in the outer circumferential region of the first and second friction regions is always higher than in the inner circumferential region of the brake disk since the heat of friction that arises is dissipated from the inner circumferential region directly onto the ring-shaped securing element which is in contact and adjacent thereto.

It has been found that the second friction region, which is remote from a rotating axis, always has a higher temperature compared to the diametrically arranged first region in braking operations. It has been found that, surprisingly, the temperature differences that occur between the first and second friction regions have the adverse effect that the brake disk is subject to coning as a result of the temperature gradient, and the surface of the hard material layer is deformed in a corrugated manner and hence causes cracking within the tribologically stressable hard material layer.

In order to achieve homogeneous thermal distribution and stress and a balanced heat budget in the tribologically stressable hard material layer and the brake disk as a whole, what is proposed in accordance with the invention is that at least one specifically designed heat conduction layer be disposed between the metallic main body and the tribologically stressable hard material layer, which, in radial direction from the ring-shaped securing element to the outer circumference of the brake disk, has a gradated thermal conductivity $\lambda_i$ and a gradated specific heat resistance $R_{thi}$.

This is achieved in accordance with the invention in that the at least one heat conduction layer consists of at least two different materials that have different thermal conductivities. In this respect, the thermal conductivity $\lambda_i$ within the heat conduction layer is gradated, there being a metallic or ceramic material and/or a metallic alloy having a thermal conductivity $\lambda_1$ at least in an inner circumferential region of the first and/or second friction regions. In an outer circumferential region of the first and/or second friction regions is disposed a metallic or ceramic material and/or a metallic alloy having a thermal conductivity $\lambda_2$. In principle, in the selection of the materials of the heat conduction layer, the thermal conductivity $\lambda_1$ in the inner circumferential region is always less than the thermal conductivity $\lambda_2$ in the outer circumferential region in radial direction of the brake disk. In this respect, in accordance with the invention, $\lambda_1 < \lambda < \lambda_2$.

By virtue of the different selection of the metallic or ceramic material and/or the metallic alloy within a heat conduction layer, the heat of braking that arises in an inner circumferential region of the brake disk is thus dissipated in a delayed manner by means of the region having low thermal conductivity $\lambda_1$, which leads to faster temperature adjustment and readiness for use of the brake disk in this region. By contrast, in the outer circumferential region of the brake disk, the heat of braking that arises, by virtue of the material having high thermal conductivity $\lambda_2$, is dissipated rapidly from the tribologically stressable hard material layer into the metallic main body, which leads to rapid cooling of the tribologically stressable hard material layer and improves the service life of the brake disk, especially by the prevention of thermal peak stresses in the outer circumferential region.

For achievement of rapid readiness for use of the braking system, especially in the case of vehicles with utilization of recuperation of braking energy and the associated smaller number of braking operations, the respective heat conduction layer, at least in radial direction relative to the outer circumference of the brake disk, may also have multiple different regions of materials that differ with regard to their thermal conductivity $\lambda_i$.

By virtue of multiple regions with different materials and hence different thermal conductivities $\lambda_1, \lambda_2 \ldots \lambda_i$, a continuous or else abrupt gradation of thermal conductivity within the heat conduction layer is achieved.

By virtue of the lower thermal conductivity $\lambda_1$ of at least one of the materials in the heat conduction layer, disposed in an inner circumferential region of the first and/or second friction regions, the heat of friction generated is stored in the tribologically stressable hard material layer and the heat conduction layer in this specific inner circumferential region. As a result, the operating temperature of the brake disk is attained more rapidly by a kind of insulation effect in the inner circumferential region of the hard material layer in question, and a faster operating temperature of the brake disk is enabled.

The temperature gradient that typically prevails in a brake disk between the inner circumferential region and the outer circumferential region, especially in the tribologically stressable hard material layer, is compensated for by the different thermal conductivities $\lambda_i$ and the different specific heat resistances $R_{thi}$ in the heat conduction layer, and the temperature within the brake disk is homogenized, which improves service life and achieves uniform braking action over the entire area of the tribologically stressable hard material layer.

In an advantageous configuration of the invention, at least two heat conduction layers may be disposed atop at least the first and/or second friction region, with a heat conduction layer disposed atop the metallic main body and the further heat conduction layer atop the heat conduction layer previously disposed thereon. The uppermost heat conduction layer here forms an interface with the tribologically stressable hard material layer and with the heat conduction layer disposed atop the metallic main body.

What is significant here, in the case of multiple heat conduction layers, is that at least the heat conduction layer disposed last that forms a cohesive bond with the tribologically stressable hard material layer has a gradation of the thermal conductivity $\lambda_i$ and hence also of the specific heat resistance $R_{thi}$ within this heat conduction layer. What this achieves is more particularly that thermal stress that occurs in the outer circumferential region in the tribologically stressable hard material layer in braking operations is avoided, and the resultant heat of braking is dissipated in a controlled manner from the outer circumferential region into the metallic main body, while, in the inner circumferential region, the heat is dissipated in a controlled delayed manner and to achieve an optimum operating temperature, the heat is directed into the stressable hard material layer.

Advantageously, the heat conduction layer is formed such that, in radial direction, there is a material having a thermal conductivity $\lambda_1$ of 10 W/(m·K) to 14 W/(m·K) in an inner circumferential region that extends up to a maximum of 40% of the circumferential area, a material having a thermal conductivity $\lambda_2$ of 12 W/(m·K) to 26 W/(m·K) in a middle circumferential region that extends from 30% to a maximum of 65% of the circumferential area, and a material having a thermal conductivity $\lambda_3$ of 24 W/(m·K) to 40 W/(m·K) in an outer circumferential region that extends from 60% up to the outer circumference of the circumferential area.

In this respect, at least one heat conduction layer, in the first and/or second friction region, has different thermal conductivities $\lambda_i$ that take account of the different temperatures in braking operations.

The coating process of laser buildup welding proposed in accordance with the invention achieves particularly advantageous technical actions and effects.

Firstly, a cohesive bond is established between the layers to be disposed, namely the at least one heat conduction layer and the tribologically stressable hard material layer, but also between the at least one heat conduction layer and the metallic main body. This brings the advantage that better conduction of heat is enabled between the layers, and better bonding of the layers to one another. In addition, improved protection from corrosion and wear is achieved.

In addition, gradation of the thermal conductivity $\lambda_i$ to be established and of the specific heat resistance $R_{thi}$ to be established of the heat conduction layer can be achieved in a simple manner specifically via the laser buildup welding proposed in accordance with the invention, which especially enables continuous or abrupt adjustment of the thermal conductivity in radial design up to the brake disk circumference. The laser buildup welding enables, during the application, continuous or discontinuous arrangement of different materials having different thermal conductivities $\lambda_i$ and specific heat resistances $R_{thi}$ onto the first and second friction regions in one production process. Moreover, the laser buildup welding enables the layer thickness ds of each heat conduction layer on the brake disk to be varied, and hence likewise the heat resistance $R_{thi}$ to be adjusted individually in particular circumferential regions of the brake disk.

Al-based, Fe-based, Ni-based, Cr-based and/or Cu-based alloy as material for the heat conduction layers according to the invention offer the advantage that it is possible via the composition of the alloy elements or of the metallic or ceramic materials to adjust the thermal conductivity $\lambda_i$ and thus the specific heat resistance $R_{thi}$ at least in radial and axial direction continuously or else in abruptly gradated manner via the laser buildup welding method.

The arrangement of the heat conduction layer by means of laser buildup welding thus enables variable adjustment of the material composition, the specific heat resistance $R_{thi}$ and the thermal conductivity $\lambda_i$, in order, for example, to dispose a material having high thermal conductivity $\lambda_i$ or low heat resistance $R_{thi}$ in thermally highly stressed regions of the first or second friction regions of the brake disk, and to use a material having high specific heat resistance $R_{thi}$ or low thermal conductivity $\lambda_i$ in regions having too low a level of thermal stress.

A further means of thermally homogenizing the brake disk which is proposed in accordance with the invention is that of providing a heat conduction layer composed solely of one material and gradating the layer thickness $d_{SW}$ of the heat conduction layer in radial direction up to the outer circumference of the brake disk, as a result of which the specific heat resistance $R_{thi}$ within the heat conduction layer is adjusted differently and hence matched to the desired temperature maps of the first and second friction regions.

In a particularly advantageous configuration, the heat conduction layer, in radial direction, has a 10%-15% greater layer thickness $d_{SW1}$ in an inner circumferential region that extends up to a maximum of 35% of the circumferential area and, in a middle circumferential region that extends from 30% to a maximum of 65% of the circumferential area, a 5%-10% greater layer thickness $d_{SW2}$ compared to the layer thickness $d_{SW3}$ in an outer circumferential region that extends from 60% of the circumferential area to the outer circumference of the brake disk.

The provision of different layer thicknesses $d_{SW}$ of at least one heat conduction layer, in particular, counteracts the unwanted shielding effect, i.e. the tilting of the first and second friction region and the associated warpage of the entire brake disk with associated formation of corrugations in the tribologically stressable hard material layer. Moreover, the effect is achieved that the heat budget in the brake disk is adjusted in an individual manner via the different specific heat resistance $R_{thi}$.

In a further advantageous configuration, the heat conduction layer additionally includes hard material particles that lead to improved strength and hardness of the heat conduction layer and hence the layer structure in the first and second friction regions. Particularly advantageously, the hard material particles have a median particle size $D_{50}$ of 0.5 µm to 120 µm and may additionally be present in a proportion by volume of 1% to 80%, particularly advantageously between 30% to 50%.

Advantageously, a brake disk is provided in which a bonding layer is present at least between the metallic main body and the at least one first heat conduction layer. A bonding layer leads to improved attachment of the first heat conduction layer on the metallic main body, such that there is no need for mechanical preparation of the surface of the metallic main body. It is also possible that a bonding layer is provided between the heat conduction layers and/or between a heat conduction layer and the tribologically stressable hard material layer, in order to improve the adhesion of the individual layers to one another and the bond strength of the entire layer structure.

For inexpensive production and a long service life of the brake disk, it is advantageous when the tribologically stressable hard material layer has at least one layer thickness $d_{SH}$ of 50 µm to 500 µm and very particularly advantageously a layer thickness $d_{SH}$ of 200 µm to 250 µm. It has been found here to be particularly advantageous when the tribologically stressable hard material layer is made of a cermet, for example silicon carbide, boron carbide, tungsten carbide, vanadium carbide, titanium carbide, tantalum carbide, chromium carbide and/or an oxide ceramic, and is particularly advantageously made of tungsten carbide having a stainless steel matrix of material group 4 or 5 with an Ni content of ≤15% by mass.

It has been found that, in the disposing of the heat conduction layer atop the metallic main body, thermal warpage of the friction regions occurs, which results in the aforementioned shielding effect. To counteract this, what is advantageously suggested is that, in a heat treatment process preceding the cohesive arrangement of the heat conduction layer by means of laser buildup welding, the metallic main body be heated to a temperature of 150° C. to 500° C. at least in a sub region of the first and/or second friction regions. This can minimize the thermally induced stresses within the brake disk. In addition, improved physical bonding of the heat conduction layer to the metallic main body is achieved. Moreover, the prior heating of the metallic main body can reduce the laser intensity in the laser buildup welding, which in turn has a positive effect on damage-free integration of the carbide in the hard material layer. A laser having lower laser power leads to lower production costs.

The solution of the invention provides a novel brake disk with which multiple technical advantages and effects are achieved.

The at least one heat conduction layer atop the first and/or second friction region of the metallic main body has either different materials or just one material having different layer thickness, which differ in terms of their thermal conductivity and/or specific heat resistance and hence enable a thermal influence on individual regions of the brake disk. The different materials or different layer thickness of the at least one heat conduction layer are gradated here such that thermal conductivity increases in radial direction at least up to the outer circumference of the brake disk, or specific heat resistance decreases continuously or abruptly in radial direction at least up to the outer circumference of the brake disk. This offers the advantage that thermal stress peaks in individual regions of the brake disk are avoided in a controlled manner,
 a homogeneous temperature distribution within the brake disk is established,
 warpage of the brake disk and cracking is prevented,
 more rapid readiness for use and braking power are provided and
 a prolonged service life of the brake disk is achieved.

What follows hereinafter is a detailed elucidation of the invention using three working examples.

BRIEF DESCRIPTION OF THE DRAWINGS

The Figures Show.

DETAILED DESCRIPTION OF THE PREFERRED EMBODIMENTS

Working Example 1

Figure 1:
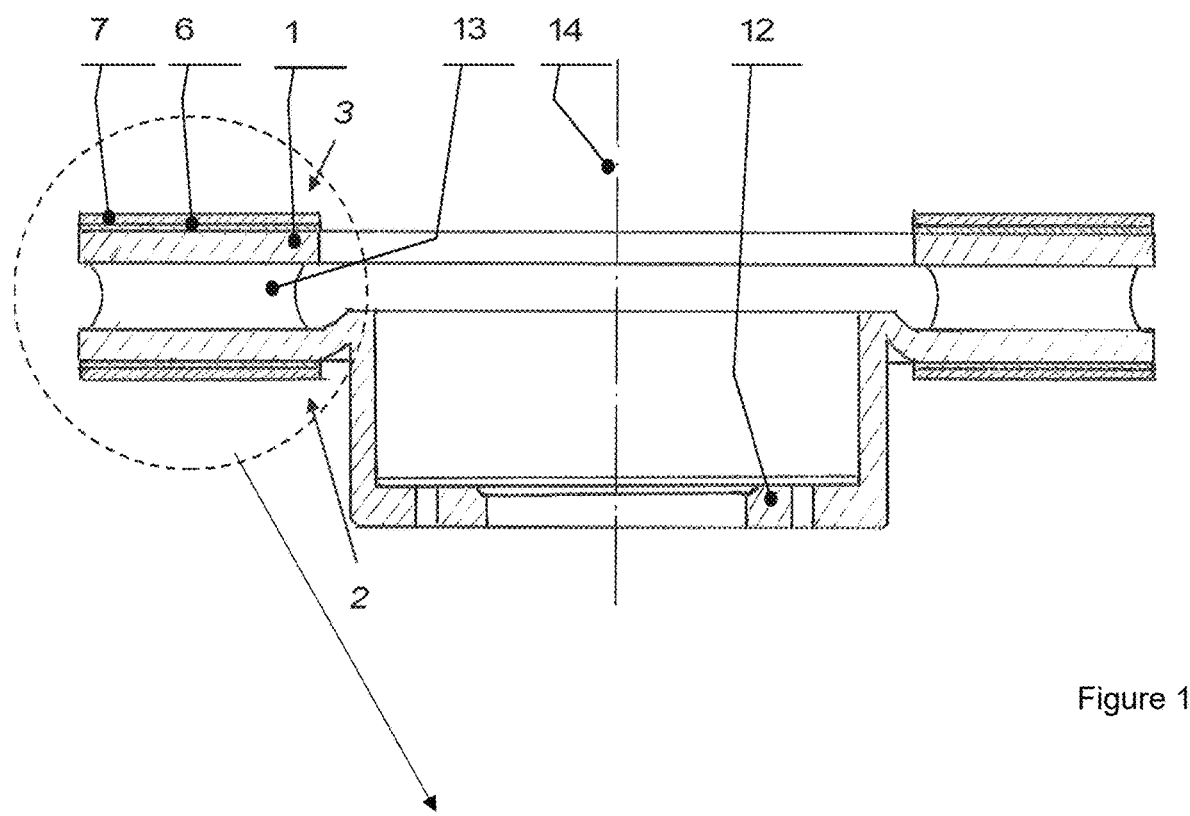
FIG. 1 a schematic cross section through a brake disk,
 FIG. 2 a detail of the first and second friction regions,
 FIG. 3 a schematic diagram of the coating of a brake disk with constant layer thickness and gradated material composition of the heat conduction layer and tribologically stressable hard material layer,
 FIG. 4 an axial top view of a brake disk with inner, middle and outer circumferential region with gradated heat conduction layer,
 FIG. 5 a schematic layer construction with gradated layer thickness of the heat conduction layer and tribologically stressable hard material layer,
 FIG. 6 a schematic layer construction with a combination of gradated layer thickness of the heat conduction layer and gradated material composition of the heat conduction layer and tribologically stressable hard material layer and
 FIG. 7 a schematic layer construction with 2 gradated heat conduction layers one on top of another.
Figure 2:
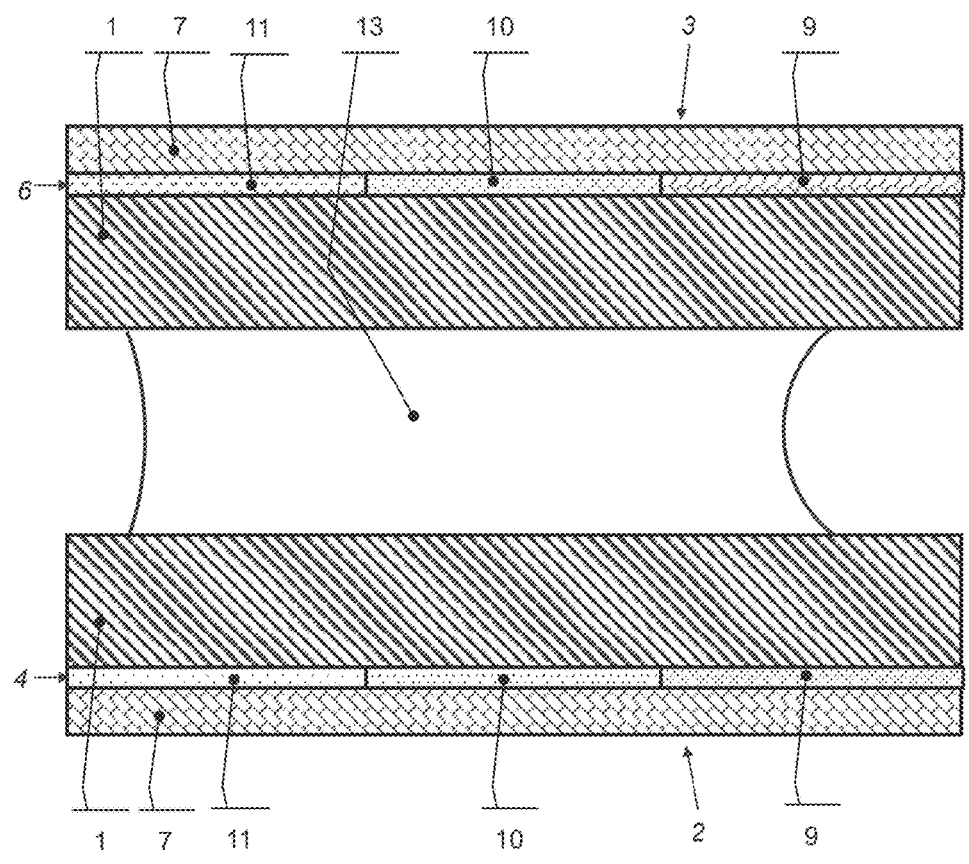

FIG. 1 and FIG. 2 shows a schematic of a cross section through a brake disk with a metallic main body 1 made of gray iron, a securing element 12 and heat conduction layers 4, 6 that are disposed on either side and diametrically on the metallic main body 1, and a tribologically stressable hard material layer 8.

The first heat conduction layer 4 facing a rotating axis 14 (FIG. 3) consists of an Fe-based alloy, and the first heat conduction layer 6 remote from a rotating axis 14 consists of an Ni-based alloy, wherein the heat conduction layers 4 and 6 are disposed on the metallic main body 1 made of gray iron by means of laser buildup welding.

Disposed atop each heat conduction layer 4 and 6 is a tribologically stressable hard material layer 8 made of tungsten carbide with a stainless steel matrix of materials number DIN EN 1.4016 (430 L) with an average layer thickness of 120 µm, having a thermal conductivity λ of 78 W/(m·K).

Figure 4:
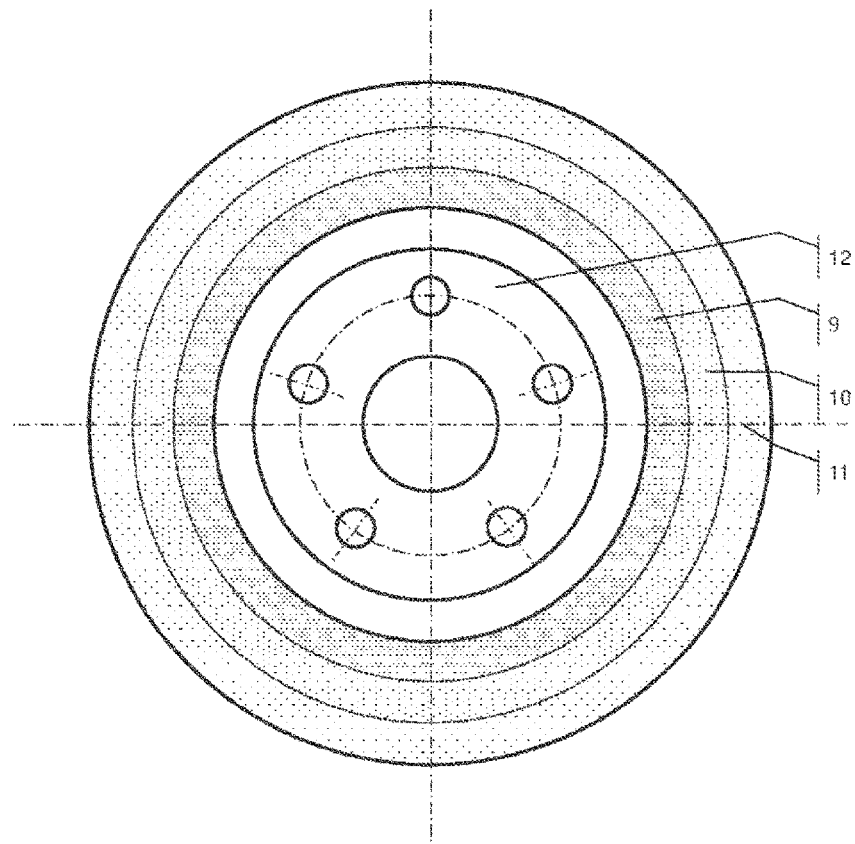

FIG. 4 shows a top view of the brake disk, wherein the brake disk has two diametric heat conduction layers 4 and 6, namely a first heat conduction layer 4 facing a rotating axis and a heat conduction layer 6 remote from a rotating axis 14.

The first heat conduction layer 4 facing a rotating axis 14 has a total of three circumferential regions 9, 10 and 11 comprising different materials in radial direction. The first material of this heat conduction layer 4 in radial direction has a thermal conductivity $\lambda_1$ of 10 W/(m·K) in an inner circumferential region 9 comprising 35% of the circumferential area of the friction region, the second material in radial direction has a thermal conductivity $\lambda_2$ of 25 W/(m·K) in a middle circumferential region 10 comprising 35% to 60% of the circumferential area of the friction region, and the third material in radial direction has a thermal conductivity $\lambda_3$ of 55 W/(m·K) in an outer circumferential region 11 comprising 60% up to the outer circumference of the circumferential area of the friction region.

The heat conduction layer 6 remote from the rotating axis 14 likewise has, in radial direction, a total of three circumferential regions 9, 10 and 11 comprising different materials. The first material of the heat conduction layer 6 remote from a rotating axis 14 in radial direction has a thermal conductivity $\lambda_1$ of 12 W/(m·K) in an inner circumferential region 9 comprising 30% of the circumferential area of the friction region, the second material in radial direction has a thermal conductivity $\lambda_2$ of 23 W/(m·K) in a middle circumferential region 10 comprising 30% to 45% of the circumferential area of the friction region, and the third material in radial direction has a thermal conductivity $\lambda_3$ of 48 W/(m·K) in an outer circumferential region 11 comprising 45% up to the outer circumference of the circumferential area of the friction region.

Figure 3:
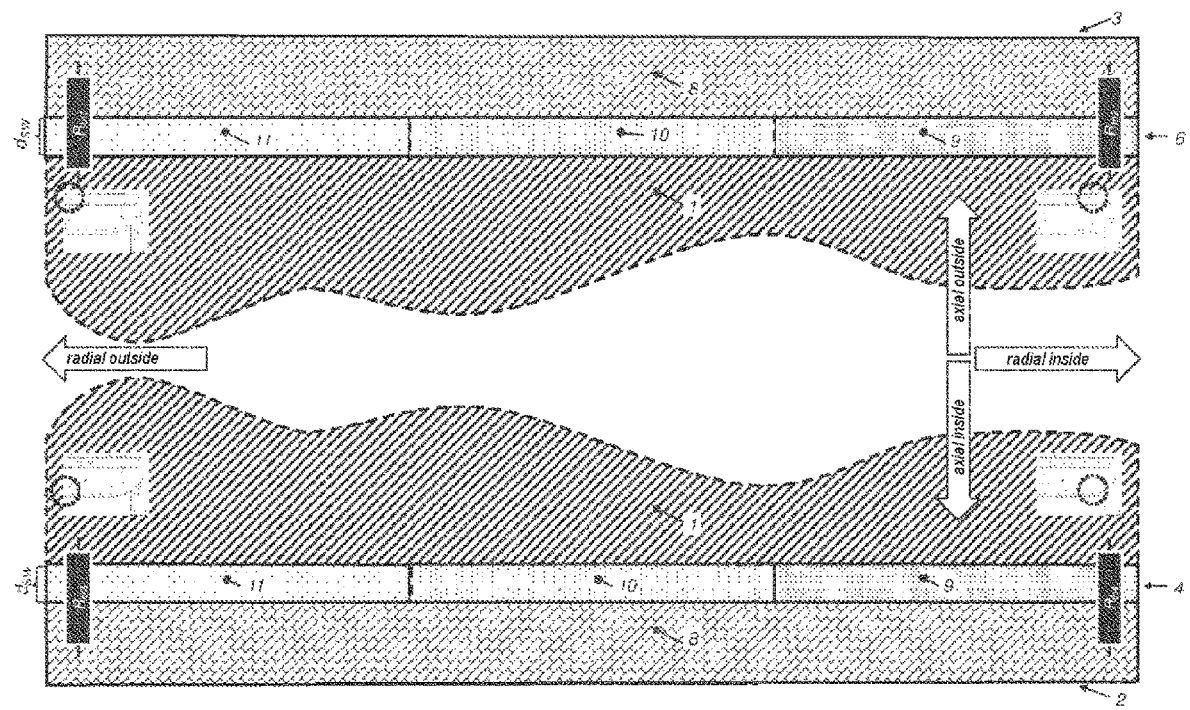
Figure 6:
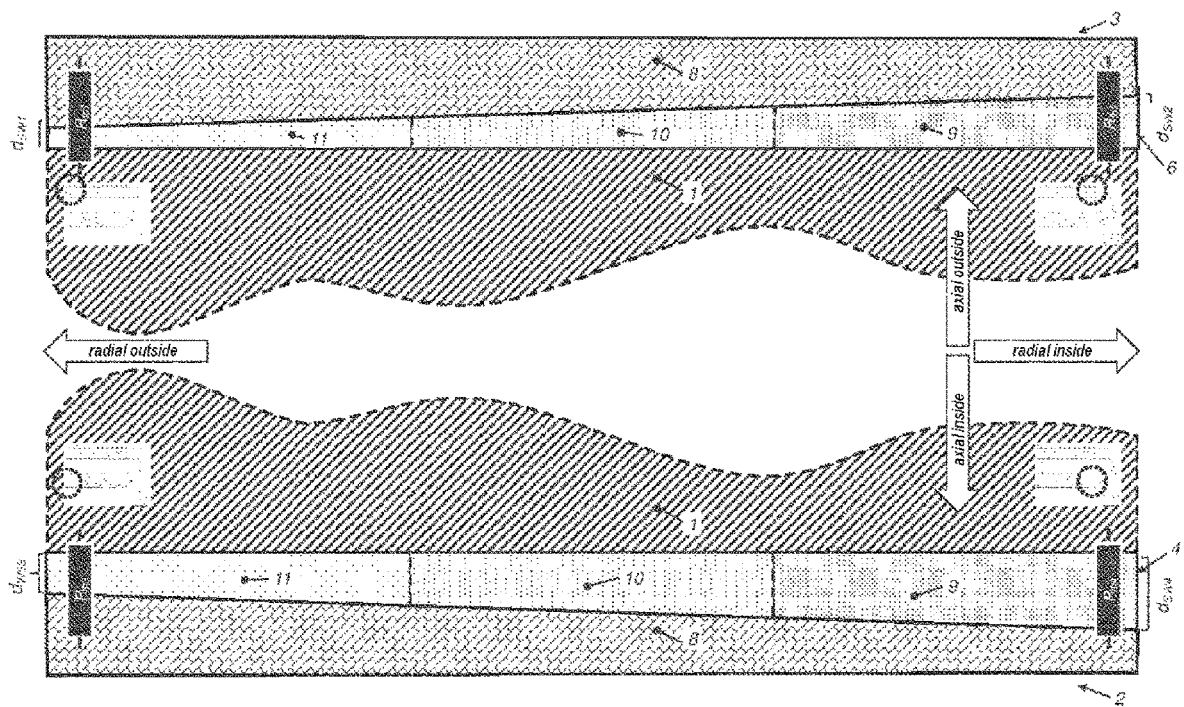

The first heat conduction layer 4 facing a rotating axis 14, as shown in FIGS. 3 and 6, in radial direction, has a constantly decreasing layer thickness $d_{SW}$, where the smallest layer thickness $d_{SW3}$ is at the outer circumference of the friction region at 90 µm, and the greatest layer thickness $d_{SW4}$ at the inner circumference of the friction region at 145 µm.

The heat conduction layer 6 remote from a rotating axis 14 has, as shown in FIGS. 3 and 6, in radial direction, a constant layer thickness $d_{SW}$ of 120 µm.

The arrangement of heat conduction layers 4 and 6 enables a homogeneous heat budget in the tribologically stressable hard material layer 8 with which faster thermal readiness for use is enabled over the entire circumferential area of the friction regions 2 and 3. Moreover, the gradated heat conduction layers 4 and 6 and the different layer thicknesses prevent the occurrence of the shielding effect, which prevents formation of cracks in the brake disk.

Working Example 2

FIG. 1 and FIG. 2 show a schematic of a cross section through a brake disk with a metallic main body 1 made of gray iron, a securing element 12 and a heat conduction layers 4, 6 that are disposed on either side and diametrically on the metallic main body, and a tribologically stressable hard material layer 8.

The first heat conduction layer 4 facing a rotating axis 14 (FIG. 3) consists of a Cr-based alloy, and the heat conduction layer remote from a rotating axis 14 consists of a Cu-based alloy, wherein the heat conduction layers 4 and 6 are disposed on the metallic main body 1 made of gray iron by means of laser buildup welding.

Disposed atop each heat conduction layer 4 and 6 is a tribologically stressable hard material layer 8 made of tungsten carbide with a stainless steel matrix of materials number DIN EN 1.4016 (430 L) with an average layer thickness of 120 µm, having a thermal conductivity λ of 78 W/(m·K).

FIG. 4 shows a top view of the brake disk, wherein the brake disk has two diametric heat conduction layers, namely a heat conduction layer 4, 6 facing a rotating axis 14 and one remote from a rotating axis 14.

The heat conduction layer 4 facing a rotating axis 14 has a total of three regions 9, 10 and 11 comprising different materials in radial direction. The first material of this heat conduction layer 4 in radial direction has a thermal conductivity $\lambda_1$ of 12 W/(m·K) in an inner circumferential region 9 comprising 30% of the circumferential area of the friction region, the second material of the heat conduction layer in radial direction has a thermal conductivity $\lambda_2$ of 23 W/(m·K) in a middle circumferential region 10 comprising 40% of the circumferential area of the friction region, and the third material of the heat conduction layer in radial direction has a thermal conductivity $\lambda_3$ of 36 W/(m·K) in an outer circumferential region 11 comprising 30% of the circumferential area of the friction region.

The heat conduction layer 6 remote from a rotating axis 14 has, in radial direction, a total of three regions 9, 10 and 11 comprising different materials. The first material of this heat conduction layer in radial direction has a thermal conductivity $\lambda_1$ of 12 W/(m·K) in an inner circumferential region 9 comprising 30% of the circumferential area of the friction region, the second material of the heat conduction layer in radial direction has a thermal conductivity $\lambda_2$ of 23 W/(m·K) in a middle circumferential region comprising 40% of the circumferential area of the friction region, and the third material of the heat conduction layer in radial direction has a thermal conductivity $\lambda_3$ of 36 W/(m·K) in an outer circumferential region 11 comprising 30% of the circumferential area of the friction region.

Figure 5:
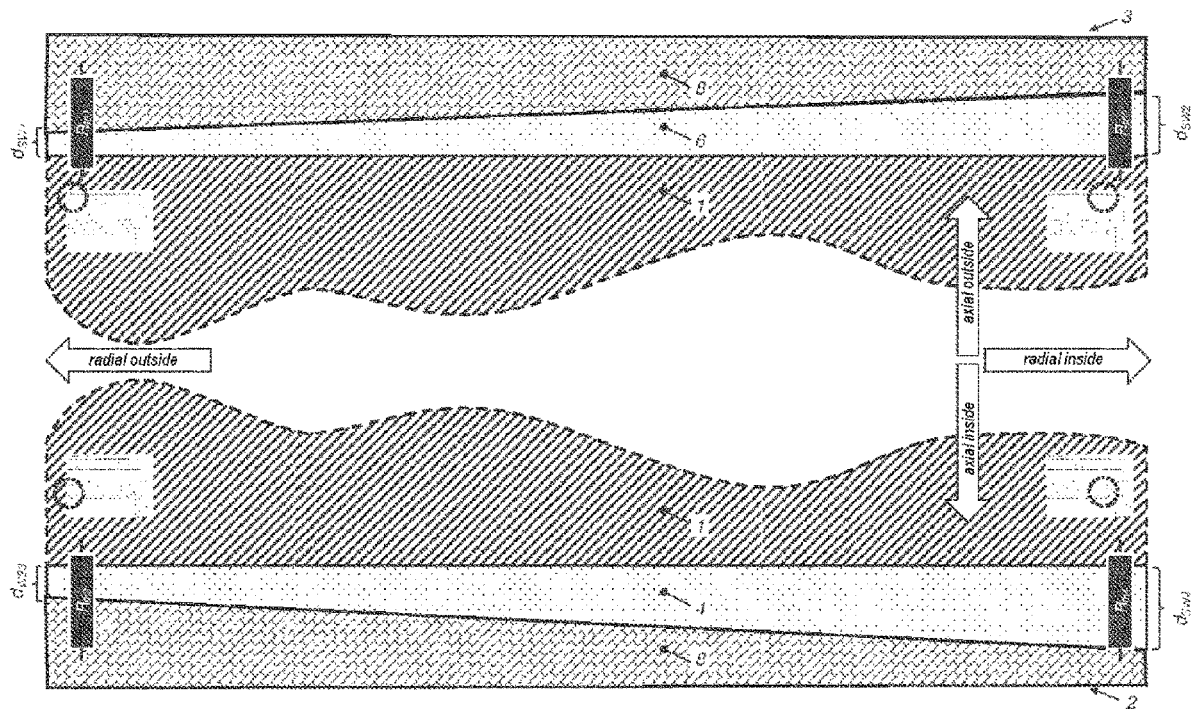

The heat conduction layer 6 remote from a rotating axis 14 and the heat conduction layer 4 facing a rotating axis 14, according to FIG. 5, have a constantly decreasing layer thickness $d_{SW}$ in radial direction, where the smallest layer thickness $d_{SW1}$ and $d_{SW3}$ is at the outer circumference of the friction region at 80 µm, and the greatest layer thickness $d_{SW2}$ and $d_{SW4}$ is at the inner circumference of the friction region at 160 µm.

The arrangement of heat conduction layers 4 and 6 enables a homogeneous heat budget in the tribologically stressable hard material layer 8 with which faster thermal readiness for use is enabled over the entire circumferential area of the friction regions 2 and 3. Moreover, the gradated heat conduction layers 4 and 6 and the different layer thicknesses prevent the occurrence of the shielding effect, which prevents formation of cracks in the brake disk.

Working Example 3

Figure 7:
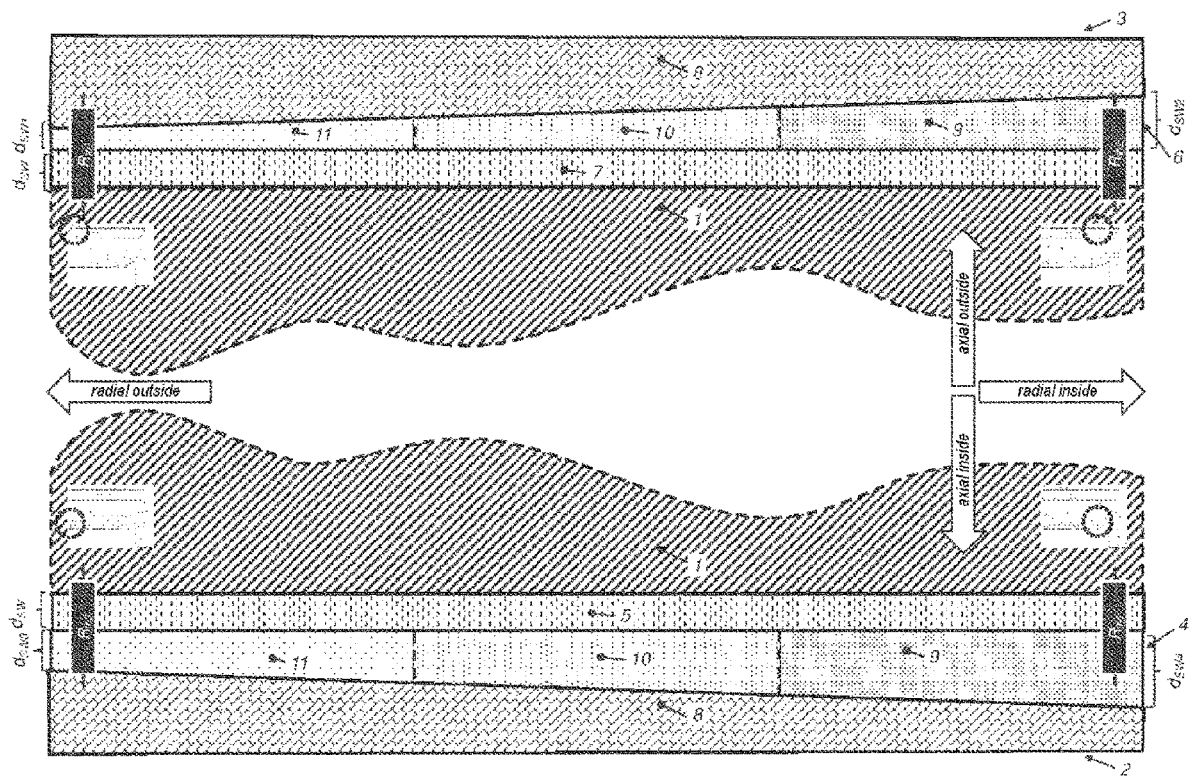

FIG. 7 shows a first friction region 2 or second friction region 3, in which two different heat conduction layers 4 and 5 and a tribologically stressable hard material layer 8 are disposed on the metallic main body 1.

The heat conduction layer 5 consists of an Al-based alloy without grading, and is disposed atop the metallic main body 1. The heat conduction layer 4 is disposed atop the heat conduction layer 5 and consists of a Cu-based alloy.

The heat conduction layer 5 has, in radial direction, a total of three regions 9, 10 and 11 comprising different materials. The first material of this heat conduction layer in radial direction has a thermal conductivity $\lambda_1$ of 12 W/(m·K) in an inner circumferential region 9 comprising 30% of the circumferential area of the friction region, the second material of the heat conduction layer has a thermal conductivity $\lambda_2$ of 23 W/(m·K) in radial direction in a middle circumferential region 10 comprising 40% of the circumferential area of the friction region, and the third material of the heat conduction layer has a thermal conductivity $\lambda_3$ of 36 W/(m·K) in radial direction in an outer circumferential region 11 comprising 30% of the circumferential area of the friction region.

The heat conduction layer 5 has a constant layer height in radial direction with an averaged thickness $d_{SW}$ of 120 μm.

The arrangement of heat conduction layers 4 and 5 enables a homogeneous heat budget in the tribologically stressable hard material layer 1 with which faster thermal readiness for use is enabled over the entire circumferential area of the friction regions 2 and 3. Moreover, the gradated heat conduction layers 4 and 5 and the different layer thicknesses prevent the occurrence of the shielding effect, which prevents formation of cracks in the brake disk.

LIST OF REFERENCE NUMERALS

1—metallic main body
2—first friction region facing a rotating axis
3—second friction region remote from a rotating axis
4—first heat conduction layer facing a rotating axis
5—second heat conduction layer facing a rotating axis
6—first heat conduction layer remote from a rotating axis
7—second heat conduction layer remote from a rotating axis
8—tribologically stressable hard material layer
9—inner circumferential region
10—middle circumferential region
11—outer circumferential region
12—securing element
13—ventilation ducts
14—rotation axis

The invention claimed is:

1. A brake disk, comprising a metallic main body (1), which has at least one ring-shaped securing element (12) for securing of the brake disk on a rotating axis (14), a first friction region (2) that faces a rotating axis (14) and takes the form of a circular surface, and a second friction region (3) arranged so as to be diametrically opposite the first friction region (2) and remote from a rotating axis, wherein the metallic main body (1), in the region of the first and second friction regions (2, 3), has at least one ring-shaped heat conduction layer (4, 6) atop which is disposed at least one tribologically stressable hard material layer (8), wherein the at least one ring-shaped heat conduction layer (4, 6) is disposed atop the metallic main body (1) and the tribologically stressable hard material layer (8) atop the at least one ring-shaped heat conduction layer (4, 6) by means of laser buildup welding, so as to achieve a cohesive bond between the layers, wherein the at least one ring-shaped heat conduction layer (4, 6) comprises at least two different materials and the thermal conductivity λ within the at least one ring-shaped heat conduction layer (4, 6) is gradated, wherein there is a metallic or ceramic material and/or a metallic alloy having a thermal conductivity $\lambda_1$ at least in an inner circumferential region (9) of the first and/or second friction regions (2, 3), and wherein there is a metallic or ceramic material and/or a metallic alloy having a thermal conductivity $\lambda_2$ in an outer circumferential region (11) of the first and/or second friction regions (2, 3), wherein at least $\lambda_1 < \lambda < \lambda_2$.

2. The brake disk as claimed in claim 1, the at least one ring-shaped heat conduction layer (4, 6), in radial direction relative to the outer circumference of the brake disk, has a gradated layer thickness $d_{SW}$, as a result of which the specific heat resistance $R_{thi}$ decreases in the at least one ring-shaped heat conduction layer (4, 6) in radial direction toward the outer circumference of the brake disk.

3. The brake disk as claimed in claim 1, in which there is an arrangement of at least two heat conduction layers, wherein a first of the at least one ring-shaped heat conduction layer is disposed atop the metallic main body and a second heat conduction layer atop the first of the at least one ring-shaped heat conduction layer, wherein the second heat conduction layer in each case forms an interfacial region with the tribologically stressable hard material layer and with the first of the at least one ring-shaped heat conduction layer.

4. The brake disk as claimed in claim 1, in which the at least one ring-shaped heat conduction layer and/or tribologically stressable hard material layer on the friction region facing a rotating axis is formed with different layer thickness compared to the at least one ring-shaped heat conduction layer and/or stressable hard material layer on the friction region remote from a rotating axis.

5. The brake disk as claimed in claim 1, in which, in radial direction toward the outer circumference of the brake disk, the at least one ring-shaped heat conduction layer in an inner circumferential region extends up to a maximum of 40% of the circumferential area, a material having a thermal conductivity $\lambda_1$ of 10 W/(m·K) to 14 W/(m·K), in a middle circumferential region that extends from 30% to a maximum of 65% of the circumferential area a material having a thermal conductivity $\lambda_2$ of 12 W/(m·K) to 26 W/(m·K), and in an outer circumferential region that extends from 60% up to the outer circumference of the circumferential area a material having a thermal conductivity $\lambda_3$ of 24 W/(m·K) to 40 W/(m·K).

6. The brake disk as claimed in claim 1, in which the at least one ring-shaped heat conduction layer has a layer thickness $d_{SW}$ that increases continuously or abruptly in radial direction toward the outer circumference of the brake disk.

7. The brake disk as claimed in claim 1, in which the at least one ring-shaped heat conduction layer has a layer thickness $d_{SWi}$ of 50 μm to 500 μm, particularly advantageously a layer thickness $d_{SWi}$ of 100 μm to 150 μm.

8. The brake disk as claimed in claim 1, in which, in radial direction toward the outer circumference of the brake disk, the at least one ring-shaped heat conduction layer has a 10%-15% greater layer thickness $d_{SW1}$ in an inner circumferential region that extends up to a maximum of 40% of the circumferential area and, in a middle circumferential region that extends from 30% to a maximum of 65% of the circumferential area, a 5%-10% greater layer thickness $d_{SW2}$ compared to the layer thickness $d_{SW3}$ in an outer circumferential region that extends from 60% of the circumferential area to the outer circumference, wherein the layer composition composed of the at least one ring-shaped heat conduction layer and tribologically stressable hard material layer is constant.

9. The brake disk as claimed in claim 1, in which the at least one ring-shaped heat conduction layer has been produced from an Al-based, Fe-based, Ni-based, Cr-based and/or Cu-based alloy.

10. The brake disk as claimed in claim 1, in which the at least one ring-shaped heat conduction layer additionally includes carbidic and/or oxide ceramic hard material particles.

11. The brake disk as claimed in claim 10, in which the hard material particles of the at least one ring-shaped heat conduction layer have a median particle size $D_{50}$ of 0.5 μm to 120 μm.

12. The brake disk as claimed in claim 10, in which the proportion by volume of the hard material particles in the at least one ring-shaped heat conduction layer is 1% to 80%, particularly advantageously 30% to 50%.

13. The brake disk as claimed in claim 1, in which the at least one ring-shaped heat conduction layer takes the form of an alloy in which, in axial direction, the lowest thermal conductivity is in a radial part-region and in the interfacial region with the tribologically stressable hard substance layer, and the highest thermal conductivity in the interfacial region with a further heat conduction layer or the metallic main body.

14. The brake disk as claimed in claim 1, in which there is a bonding layer at least between the metallic main body and a first of the at least one ring-shaped heat conduction layer.

15. The brake disk as claimed in claim 1, in which the tribologically stressable hard material layer has at least a layer thickness $d_{SH}$ of 50 μm to 500 μm, particularly advantageously a layer thickness $d_{SH}$ of 200 μm to 250 μm.

16. The brake disk as claimed in claim 1, in which the tribologically stressable hard material layer consists of a cermet, particularly advantageously of silicon carbide, boron carbide, tungsten carbide, vanadium carbide, titanium carbide, tantalum carbide, chromium carbide and/or an oxide ceramic, and very particularly advantageously of tungsten carbide with a stainless steel matrix of material group 4 or 5 with an Ni content of ≤15% by mass.

17. A method of producing the brake disk as claimed in claim 1, in which a first of the at least one ring-shaped heat conduction layer (4, 6) is disposed in a cohesively bonded manner at least partly at least atop a metallic main body (1) by means of laser buildup welding, and then a tribologically stressable hard material layer (8) is disposed in a cohesively bonded manner atop the first of the least one ring-shaped heat conduction layer (4, 6), wherein the at least one ring-shaped heat conduction layer (4, 6) is disposed of at least two different materials and the thermal conductivity $\lambda_i$ within the at least one ring-shaped heat conduction layer is gradated, such that the at least one ring-shaped heat conduction layer has increasing thermal conductivity $\lambda$ in radial direction, wherein a metallic or ceramic material and/or a metallic alloy having a thermal conductivity $\lambda_1$ is disposed at least in an inner circumferential region (9) of the first and/or second friction regions (2, 3) and a metallic or ceramic material and/or a metallic alloy having a thermal conductivity $\lambda_2$ is disposed in an outer circumferential region (11) of the first and/or second friction regions (2, 3), and the surface of the tribologically stressable hard material layer (8) is finally processed.

18. The method as claimed in claim 17, in which, in radial direction toward the outer circumference of the brake disk, the at least one ring-shaped heat conduction layer is disposed in an inner circumferential region that extends up to a maximum of 35% of the circumferential area, a material having a thermal conductivity $\lambda_1$ of 10 W/(m·K) to 14 W/(m·K), in a middle circumferential region that extends from 30% to a maximum of 65% of the circumferential area a material having a thermal conductivity $\lambda_2$ of 12 W/(m·K) to 26 W/(m·K), and in an outer circumferential region that extends from 60% up to the outer circumference of the circumferential area a material having a thermal conductivity $\lambda_3$ of 24 W/(m·K) to 40 W/(m·K).

19. The method as claimed in claim 17, in which, before the at least one ring-shaped heat conduction layer is disposed by means of laser buildup welding, the metallic main body is heated at least in a subregion of the first and/or second friction regions to a temperature of 150° C. to 500° C.

20. A method of producing the brake disk as claimed in claim 1, in which a first of the at least one ring-shaped heat conduction layer (4, 6) is disposed in a cohesively bonded manner at least partly at least atop a metallic main body (1) by means of laser buildup welding, and then a tribologically stressable hard material layer (8) is disposed in a cohesively bonded manner atop the first of the at least one ring-shaped heat conduction layer (4, 6), so as to achieve a cohesive bond between the layers (4, 6, 8), wherein the at least one ring-shaped heat conduction layer (4, 6), in radial direction relative to the outer circumference of the brake disk, is disposed with gradated layer thickness $d_{SW}$, as a result of which the specific heat resistance $R_{thi}$ decreases in the at least one ring-shaped heat conduction layer (4, 6) in radial direction toward the outer circumference of the brake disk.

21. The method as claimed in claim 20, in which, in a first step, in radial direction, the at least one ring-shaped heat conduction layer is disposed in an inner circumferential region that extends up to a maximum of 35% of the circumferential area with a 10%-15% greater layer thickness $d_{S1}$, and in an inner circumferential region that extends from 30% to a maximum of 65% of the circumferential area with a 5%-10% greater layer thickness $d_{S2}$ compared to the layer thickness $d_{S3}$ in an outer circumferential region that extends from 60% of the circumferential area to the outer circumference of the brake disk, such that the specific heat resistance $R_{thi}$ decreases in a gradated manner in the at least one ring-shaped heat conduction layer from the inner circumferential region to the outer circumferential region.

\* \* \* \* \*